(12) United States Patent
Shi (10) Patent No.: US 11,207,591 B2
(45) Date of Patent: Dec. 28, 2021

(54) GAMEPAD CONTROL METHOD, STORAGE MEDIUM, AND GAMEPAD

(71) Applicant: JRD Communication (Shenzhen) LTD., Shenzhen (CN)

(72) Inventor: Kaijun Shi, Shenzhen (CN)

(73) Assignee: JRD Communication (Shenzhen) LTD., Shenzhen (CN)

(*) Notice: Subject to any disclaimer, the term of this patent is extended or adjusted under 35 U.S.C. 154(b) by 3 days.

(21) Appl. No.: 16/636,033

(22) PCT Filed: Aug. 2, 2018

(86) PCT No.: PCT/CN2018/098356
§ 371 (c)(1),
(2) Date: Feb. 3, 2020

(87) PCT Pub. No.: WO2019/024894
PCT Pub. Date: Feb. 7, 2019

(65) Prior Publication Data
US 2020/0215428 A1  Jul. 9, 2020

(30) Foreign Application Priority Data
Aug. 3, 2017 (CN) .......................... 201710656381.2

(51) Int. Cl.
*A63F 13/24* (2014.01)
*A63F 13/21* (2014.01)

(52) U.S. Cl.
CPC .............. *A63F 13/24* (2014.09); *A63F 13/21* (2014.09); *A63F 2300/10* (2013.01)

(58) Field of Classification Search
CPC ....... A63F 13/24; A63F 13/21; A63F 2300/10
USPC .......................................................... 463/37
See application file for complete search history.

(56) References Cited

U.S. PATENT DOCUMENTS

| 9,557,845 B2* | 1/2017 | Shahparnia ........... G06F 3/0442 |
| 9,891,765 B2* | 2/2018 | Wright .................. G06F 3/0393 |
| 10,152,165 B2* | 12/2018 | Hao ....................... G06F 3/0446 |
| 2004/0147310 A1* | 7/2004 | Hosaka ................. A63F 7/022 463/25 |
| 2004/0252867 A1* | 12/2004 | Lan ...................... G06K 9/0004 382/124 |
| 2009/0251843 A1* | 10/2009 | Hironaka ............. H05K 9/0067 361/216 |
| 2010/0164559 A1 | 7/2010 | Park |

(Continued)

FOREIGN PATENT DOCUMENTS

| CN | 2535634 | 2/2003 |
| CN | 202844542 | 4/2013 |

(Continued)

OTHER PUBLICATIONS

Azoteq, "IQS229 Datasheet", published 2013 (Year: 2013).*

(Continued)

*Primary Examiner* — Michael A Cuff (57) ABSTRACT

A gamepad control method, a storage medium, and a gamepad. The method comprises: when a hand approaches a gamepad, a sensor (11) acquires a first sensing signal; and generate a low-level signal according to the first sensing signal to control the gamepad to be started according to the low-level signal.

12 Claims, 3 Drawing Sheets

(56) References Cited

U.S. PATENT DOCUMENTS

| | | | | |
|---|---|---|---|---|
| 2011/0118030 A1* | 5/2011 | Walley | ............... | G06F 21/32 |
| | | | | 463/37 |
| 2011/0124405 A1* | 5/2011 | Okada | ............... | G07D 7/0034 |
| | | | | 463/25 |
| 2016/0061983 A1* | 3/2016 | Heikura | ............... | H01Q 1/243 |
| | | | | 324/207.15 |
| 2016/0139704 A1* | 5/2016 | Yi | ............... | G06F 3/04164 |
| | | | | 345/174 |
| 2016/0151000 A1* | 6/2016 | Shimuta | ............... | A61B 5/7235 |
| | | | | 600/484 |
| 2016/0201377 A1* | 7/2016 | Nishikibe | ............... | E05F 15/42 |
| | | | | 49/28 |
| 2017/0118642 A1* | 4/2017 | Fukui | ............... | H04L 63/0861 |
| 2018/0217715 A1* | 8/2018 | Cobanoglu | ............... | G06F 1/163 |
| 2020/0057521 A1* | 2/2020 | Lee | ............... | G02F 1/133514 |

FOREIGN PATENT DOCUMENTS

| | | |
|---|---|---|
| CN | 103607186 | 2/2014 |
| CN | 107485854 | 12/2017 |
| WO | WO 2019/024894 | 2/2019 |

OTHER PUBLICATIONS

International Search Report and the Written Opinion dated Oct. 17, 2018 From the International Searching Authority Re. Application No. PCT/CN2018/098356 and Its Translation of Search Report Into English. (10 Pages).

* cited by examiner

GAMEPAD CONTROL METHOD, STORAGE MEDIUM, AND GAMEPAD

RELATED APPLICATIONS

This application is a National Phase of PCT Patent Application No. PCT/CN2018/098356 having International filing date of Aug. 2, 2018, which claims the benefit of priority of Chinese Patent Application No. 201710656381.2 filed on Aug. 3, 2017. The contents of the above applications are all incorporated by reference as if fully set forth herein in their entirety.

FIELD AND BACKGROUND OF THE INVENTION

The present invention relates to a game device, and more particularly, to a gamepad and a related control method and storage medium.

In nowadays, games become more and more delicate and smart. Gamepad, as the human-machine interface, is the core for the player to control the games. However, when the player is playing the game, if the player wants to deal with another matter or the player finishes another matter and wants to resume the game, the player need to push the "pause" or "resume" buttons of the gamepad. This requires further manual operations from the player and is not convenient for the player.

Therefore, an improvement and modification to the above issue is required.

SUMMARY OF THE INVENTION

One objective of an embodiment of the present invention is to provide a gamepad and a related control method and storage medium to solve the above-mentioned issue of requiring manual operations of pushing the "pause" or "resume" buttons of the gamepad.

According to an embodiment of the present invention, a control method of a gamepad is disclosed. A surface of the gamepad comprises a sensor. The control method comprises:

utilizing the sensor to obtain a first sensing signal when a human hand is close to the gamepad; and generating a low voltage level signal according to the first sensing signal and activating the gamepad according to the low voltage level signal.

According to the control method, the control method further comprises:

activating a first timer to record a duration of the first sensing signal before the step of generating the low voltage level signal according to the first sensing signal and activating the gamepad according to the low voltage level signal.

According to the control method, the step of generating the low voltage level signal according to the first sensing signal and activating the gamepad according to the low voltage level signal comprises:

generating the low voltage level signal according to the first sensing signal and activating the gamepad according to the low voltage level signal when the duration of the first sensing signal is longer than a predetermined threshold.

According to the control method, the control method further comprises:

utilizing the sensor to obtain a second sensing signal and utilizing a second timer to record a duration of the second sensing signal when the human hand is far from the gamepad; and when the duration of the second sensing signal is longer than a predetermined threshold, generating a high voltage level signal and control the gamepad to pause according to the high voltage level signal.

According to the control method, the sensor comprises a control circuit to generate the low voltage level signal and/or the high voltage level signal.

According to the control method, the control circuit comprises a main control module, an input module, an output module, an anti-static module, a filter module and a modulation module, and the control method comprises:

sending a sensing signal from the input module to the main control module through the anti-static module and the filter module; wherein the anti-static module performs an anti-static operation on the sensing signal and the filter module performs a filtering operation on the sensing signal; utilizing the main control module to generate a voltage level signal carrying a control signal according to the sensing signal and sending the voltage level signal carrying the control signal to the modulation module; utilizing the modulation module to modulate the voltage level signal according to the control signal to output the low voltage level signal to the output module; and utilizing the output module to output the low voltage level signal.

According to the control method, the anti-static module comprises a Transient Voltage Suppressor (TVS) diode, one end of the TVS diode is electrically connected to the input module and the filter module, and another end the TVS diode is electrically connected to a ground.

According to an embodiment of the present invention, a storage medium is disclosed. The storage medium stores a plurality of instructions for a processor to execute to perform following operations:

utilizing a sensor to obtain a first sensing signal when a human hand is close to a gamepad, wherein a surface of the gamepad comprises the sensor;

generating a low voltage level signal according to the first sensing signal and activating the gamepad according to the low voltage level signal;

utilizing the sensor to obtain a second sensing signal and when the human hand is far from the gamepad; and generating a high voltage level signal and control the gamepad to pause according to the high voltage level signal.

In the storage medium, the operation of generating the low voltage level signal according to the first sensing signal and activating the gamepad according to the low voltage level signal comprises:

activating a first timer to record a duration of the first sensing signal; and generating the low voltage level signal according to the first sensing signal and activating the gamepad according to the low voltage level signal when the duration of the first sensing signal is longer than a predetermined threshold.

In the storage medium, the operation of generating the high voltage level signal and control the gamepad to pause according to the high voltage level signal comprises:

utilizing a second timer to record a duration of the second sensing signal when the human hand is far from the gamepad; and when the duration of the second sensing signal is longer than a predetermined threshold, generating the high voltage level signal and control the gamepad to pause according to the high voltage level signal.

According to an embodiment of the present invention, a gamepad is disclosed. The gamepad comprises:

a storage device, configured to store a plurality of instructions;

a processor, configured to execute the instructions to perform following operations:

utilizing the sensor to obtain a first sensing signal when a human hand is close to the gamepad, wherein the first sensing signal is corresponding to a capacitance variance of a sensing antenna capacitor due to a charge variance in the sensing antenna of the sensor caused by the human hand;

generating a low voltage level signal according to the first sensing signal and activating the gamepad according to the low voltage level signal;

utilizing the sensor to obtain a second sensing signal and when the human hand is far from the gamepad, wherein the second sensing signal is corresponding to a capacitance variance of the sensing antenna capacitor due to a charge variance in the sensing antenna of the sensor caused by the human hand; and generating a high voltage level signal and control the gamepad to pause according to the high voltage level signal.

In the gamepad, the operation of generating the low voltage level signal according to the first sensing signal and activating the gamepad according to the low voltage level signal comprises:

activating a first timer to record a duration of the first sensing signal; and generating the low voltage level signal according to the first sensing signal and activating the gamepad according to the low voltage level signal when the duration of the first sensing signal is longer than a predetermined threshold.

In the gamepad, the operation of generating the high voltage level signal and control the gamepad to pause according to the high voltage level signal comprises:

utilizing a second timer to record a duration of the second sensing signal when the human hand is far from the gamepad; and when the duration of the second sensing signal is longer than a predetermined threshold, generating the high voltage level signal and control the gamepad to pause according to the high voltage level signal.

In the gamepad, the sensor comprises a sensing antenna and a control circuit.

In the gamepad, the gamepad comprises a first gamepad and a second gamepad, a sensor comprises a first sensor and a second sensor, the first sensor is installed in the first gamepad and the second sensor is installed in the second gamepad.

In the gamepad, the control circuit comprises a main control module, an input module, an output module, an antistatic module, a filter module and a modulation module; the input module sends a sensing signal to the main control module through the anti-static module and the filter module; the anti-static module performs an anti-static operation on the sensing signal and the filter module performs a filtering operation on the sensing signal; the main control module generates a voltage level signal carrying a control signal according to the sensing signal and sends the voltage level signal carrying the control signal to the modulation module; the modulation module modulates the voltage level signal according to the control signal to output the low voltage level signal to the output module; and the output module outputs the low voltage level signal to the main control module.

In the gamepad, the input module comprises an input end, the output module comprises two output ends, the two output ends are respectively a PSENSOR output end and a FPIO7 PSENSOR output end; the main control module comprises a main chip having a TIMER pin, a VSS pin, a CRXO pin, a VDDHI pin, a VREG pin, a THRI pin, a MOV THR pin, a THRO pin, a first OUT pin, a second OUT pin and a GND pin; the TIMER pin, the CRXO pin, the VDDHI pin, and the VRFG pin are respectively electrically connected to the filter module, the THRO pin and the THRI pin are respectively electrically connected to the modulation module; the CRXO pin is electrically connected to the input module and the antistatic module; the first OUT pin is electrically connected to the modulation module and the PSENSOR output end; the second OUT pin is electrically connected to the modulation module and the FPIO7 PSENSOR output end; and the VSS pin and the GND pin are electrically connected to the ground.

In the gamepad, the filter module comprise a first resistor R1, a second resistor R2, a first capacitor C1, a second capacitor C2, a third capacitor C3, a fourth capacitor C4 and a fifth capacitor C5; the first resistor R1 is electrically connected to a TIMER pin, one end of the second resistor R2 is electrically connected to a CRXO pin and another end of the second resistor R2 is electrically connected to the antistatic module and an input end; one end of the first capacitor C1 is electrically connected to a VDDHI pin and another end of the first capacitor C1 is electrically connected to a ground; one end of the second capacitor C2 is electrically connected to a VDDHI pin and another end of the second capacitor C2 is electrically connected to the ground; one end of the third capacitor C3 is electrically connected to a CRXO pin and another end of the third capacitor C3 is electrically connected to the ground; one end of the fourth capacitor C4 is electrically connected to a VREG pin and another end of the fourth capacitor C4 is electrically connected to the ground; and one end of the fifth capacitor C5 is electrically connected to the VREG pin and another end of the fifth capacitor C5 is electrically connected to the ground.

In the gamepad, the antistatic module comprises a TVS diode, one end of the TVS diode is electrically connected to an input end of the input module and a second resistor of the filter module, and another end the TVS diode is electrically connected to a ground.

In the gamepad, the modulation module comprises a third resistor R3, a fourth resistor R4, a fifth resistor R5, a sixth resistor R6, a seventh resistor R7, an eighth resistor R8 and a ninth resistor R9; the third resistor R3 and the fourth resistor R4 are respectively electrically connected to a THRI pin, the fifth resistor R5 and the sixth resistor R6 are respectively electrically connected to a THRO pin, the third resistor R3, the fourth resistor R4, the fifth resistor R5 and the sixth resistor R6 are used to modulate a sensitivity of a voltage level signal; the seventh resistor R7 is electrically connected to a first OUT pin and an end of the ninth resistor R9; another end of the ninth resistor R9 is electrically connected to a PSENSOR output end; one end of the eighth resistor R8 is electrically connected to a FPIO7 PSENSOR output end and a second OUT pin and another end of the eighth resistor R8 is electrically connected to a ground; the seventh resistor R7, the eighth resistor R8 and the ninth resistor R9 are used to adjust a voltage level of the voltage level signal.

An embodiment of the present invention provides a gamepad, a related control method and storage medium. The control method comprises utilizing a sensor to obtain a first sensing signal when a human hand is close to the gamepad; and generating a low voltage level signal according to the first sensing signal and activating the gamepad according to the low voltage level signal. Through installing the sensor on the gamepad, an embodiment of the present invention could obtain corresponding sensing information from the sensor when the human hand is close to the gamepad and control the gamepad to resume or to pause the game according to a voltage signal generated correspondingly to the sensing information. This achieves the automatic control based on the human hand information and makes it easier for the player to control the game.

DESCRIPTION OF SPECIFIC EMBODIMENTS OF THE INVENTION

The present disclosure a gamepad, a related control method and storage medium. These and other features, aspects and advantages of the present disclosure will become understood with reference to the following description, appended claims and accompanying figures.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. When an element or layer is referred to as being "directly on," "directly connected to", "directly coupled to", or "immediately adjacent to" another element or layer, there are no intervening elements or layers present.

Any process or method described in the flowchart or otherwise described herein may be understood to include one or more modules, fragments, or portions of code of an executable instruction to implement a particular logical function or process. In addition, the scope of at least one embodiment of the present disclosure includes additional implementations in which the functions may be performed in a sequence that is not shown or discussed, including in a substantially simultaneous manner or in the reverse order depending on the function involved, which is understood by those skilled in the art to which this present disclosure pertains.

The invention is described below in detail with reference to the accompanying drawings, in which exemplary embodiments of the invention are shown.

Figure 1:
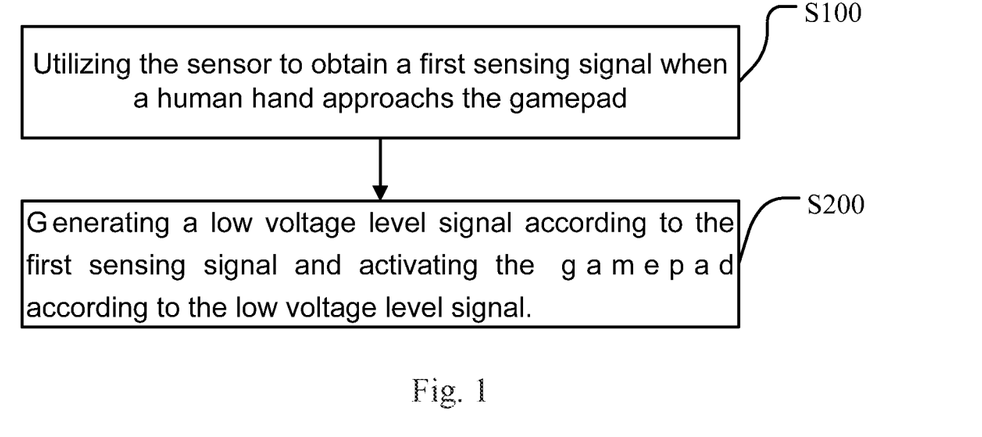
FIG. 1 is a flow chart of a control method of a gamepad according to an embodiment of the present invention.

Please refer to FIG. 1. FIG. 1 is a flow chart of a control method of a gamepad according to an embodiment of the present invention. The control method comprises:

S100: utilizing the sensor to obtain a first sensing signal when a human hand is close to (approaching) the gamepad.

S200: generating a low voltage level signal according to the first sensing signal and activating the gamepad according to the low voltage level signal.

In this embodiment, a control method of the gamepad is provided. The sensor is installed on the surface of the gamepad. The sensor could detect that a human hand approaches/leaves the gamepad to obtain corresponding sensing information and generate a corresponding voltage level signal according to the sensing information. The voltage level signal is then used to control the gamepad. For example, the gamepad could be controlled to be activated or paused according to the voltage level signal. This realizes the automatic control of the gamepad according to the condition of the human hand. Thus, this reduces the manual operations and makes it easier for the player to use.

In the step S100, the sensor is pre-installed on the gamepad for detecting human body information. The sensor comprises a sensing antenna and a control circuit. The sensing antenna is electrically connected to the control circuit through the wires. The control circuit is electrically connected to a main controller of the gamepad and transfers the high voltage level signal/low voltage level signal generated according to the sensing signal to the main controller such that the main controller could activate/pause the gamepad according to the high voltage level signal/low voltage level signal.

When the human hand is close to the sensing antenna of the gamepad, the charges in the sensing antenna change. The variance of the charges results in the capacitance variance of the sensing antenna such that a first sensing signal is generated accordingly. The sensing antenna transfers the capacitance variance (the first sensing signal) to the control circuit through the wires. In this embodiment, the gamepad comprises the first gamepad the second gamepad. Furthermore, there are two sensing antennas, respectively installed on the first and the second gamepads and could touch the human hand when the player holds the gamepads.

Figure 2:
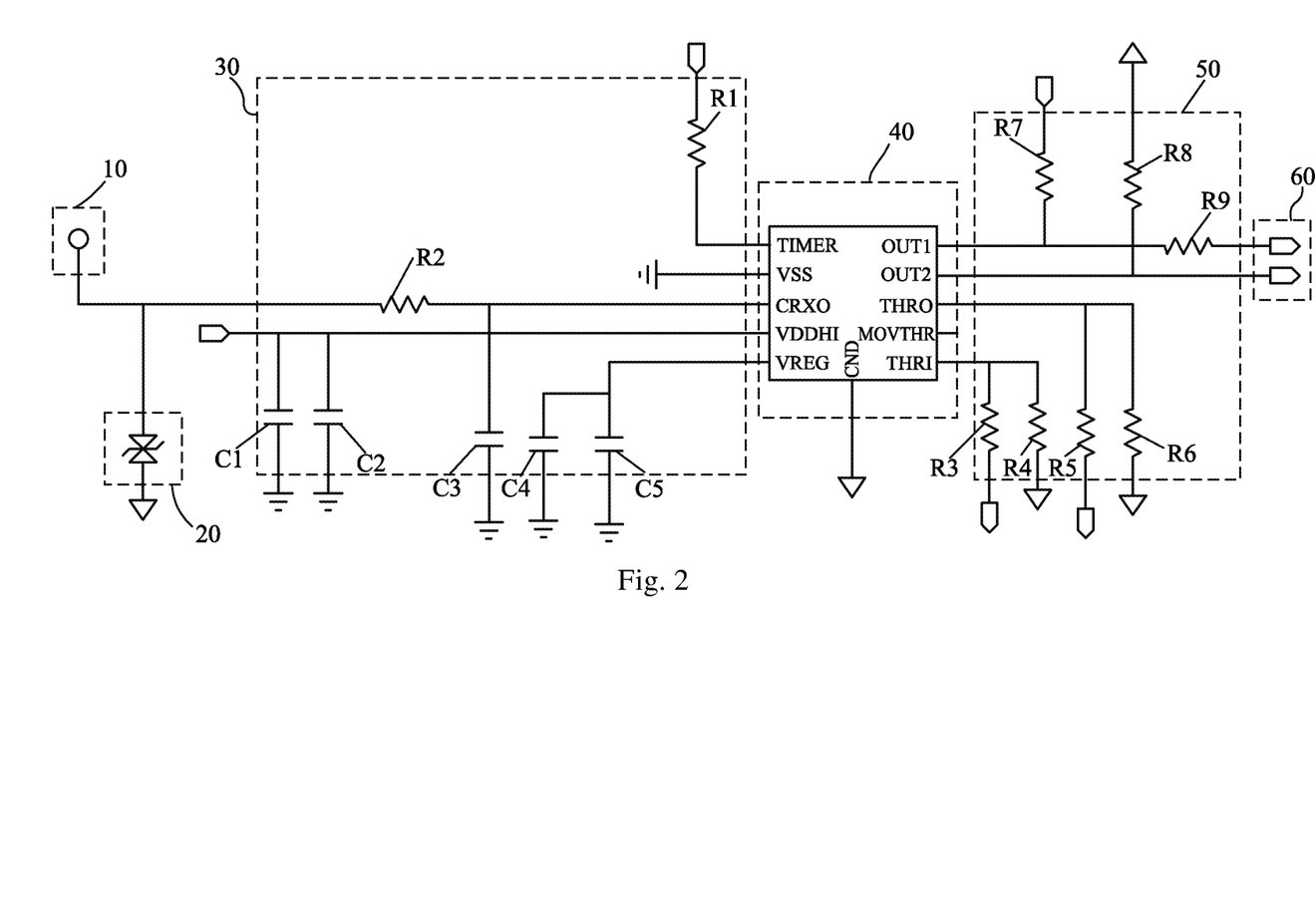
FIG. 2 is a circuit diagram of a control circuit of a gamepad according to an embodiment of the present invention.

The sensor could be the model type IQS229 sensor. As shown in FIG. 2, the control circuit of the sensor comprises a main control module 40, the input module 10, the output module 60, the antistatic module 20, the filter module and the modulation module 50. The input module 10 transfers a sensing signal to the main control module 40 through the anti-static module 20 and the filter module 30. The anti-static module 20 performs an anti-static operation on the sensing signal and the filter module 30 performs a filtering operation on the sensing signal. The main control module 40 generates a voltage level signal carrying a control signal according to the sensing signal and sends the voltage level signal carrying the control signal to the modulation module 50. The modulation module modulates the voltage level signal according to the control signal to output the low voltage level signal to the output module 60. The output module 60 outputs the low voltage level signal to the main control module.

The input module 10 comprises an input end. The output module 60 comprises two output ends. The two output ends are respectively a PSENSOR output end and a FPIO7 PSENSOR output end. The main control module 40 could be a main chip having a TIMER pin, a VSS pin, a CRXO pin, a VDDHI pin, a VREG pin, a THRI pin, a MOV THR pin, a THRO pin, a first OUT pin, a second OUT pin and a GND pin. The TIMER pin, the CRXO pin, the VDDHI pin, and the VRFG pin are respectively electrically connected to the filter module 30. The THRO pin and the THRI pin are respectively electrically connected to the modulation module 50. The CRXO pin is electrically connected to the input module 10 and the antistatic module 20. The first OUT pin is electrically connected to the modulation module 50 and the PSENSOR output end. The second OUT pin is electrically connected to the modulation module 50 and the FPIO7 PSENSOR output end. The VSS pin and the GND pin are electrically connected to the ground.

The filter module 30 comprise a first resistor R1, a second resistor R2, a first capacitor C1, a second capacitor C2, a third capacitor C3, a fourth capacitor C4 and a fifth capacitor C5. The first resistor R1 is electrically connected to the TIMER pin. One end of the second resistor R2 is electrically connected to the CRXO pin and another end of the second resistor R2 is electrically connected to the antistatic module 20 and an input end. One end of the first capacitor C1 is electrically connected to the VDDHI pin and another end of the first capacitor C1 is electrically connected to the ground. One end of the second capacitor C2 is electrically connected to the VDDHI pin and another end of the second capacitor C2 is electrically connected to the ground. One end of the third capacitor C3 is electrically connected to the CRXO pin and another end of the third capacitor C3 is electrically connected to the ground. One end of the fourth capacitor C4 is electrically connected to the VREG pin and another end of the fourth capacitor C4 is electrically connected to the ground. One end of the fifth capacitor C5 is electrically connected to the VREG pin and another end of the fifth capacitor C5 is electrically connected to the ground.

The antistatic module 20 comprises a TVS diode. One end of the TVS diode is electrically connected to the input end of the input module 10 and the second resistor R2 of the filter module 40, and another end the TVS diode is electrically connected to a ground.

The modulation module 50 comprises a third resistor R3, a fourth resistor R4, a fifth resistor R5, a sixth resistor R6, a seventh resistor R7, an eighth resistor R8 and a ninth resistor R9. The third resistor R3 and the fourth resistor R4 are respectively electrically connected to the THRI pin. The fifth resistor R5 and the sixth resistor R6 are respectively electrically connected to the THRO pin. The third resistor R3, the fourth resistor R4, the fifth resistor R5 and the sixth resistor R6 are used to modulate a sensitivity of a voltage level signal. The seventh resistor R7 is electrically connected to the first OUT pin and an end of the ninth resistor R9. Another end of the ninth resistor R9 is electrically connected to the PSENSOR output end. One end of the eighth resistor R8 is electrically connected to the FPIO7 PSENSOR output end and the second OUT pin and another end of the eighth resistor R8 is electrically connected to the ground. The seventh resistor R7, the eighth resistor R8 and the ninth resistor R9 are used to adjust a voltage level of the voltage level signal.

Furthermore, in step S200, generating the low voltage signal based on the first sensing signal indicates to that the detected variance of charges generates the capacitance variance and the capacitance variance is used as the first sensing signal. The first sensing signal is then send to the input end of the control circuit. Then, the control circuit generates the high voltage signal according to the capacitance variance (the first sensing signal). Then, the control circuit outputs a low voltage signal to the main controller of the gamepad according to the high voltage level to activate the gamepad through the main controller.

In order to ensure the accuracy of the sensor, the duration of the first sensing signal could be monitored and compared with a predetermined threshold. When the duration is longer than the predetermined threshold, the low voltage level signal is generated to activate the gamepad. This could avoid any incorrect operation if the player merely passes by the gamepad.

In this embodiment, the control method of the gamepad could comprise:

S11: When the human hand is close to (approaching) the gamepad, the sensor obtains the first sensing signal.

S12: Activate the first timer to record the duration of the first sensing signal.

S13: generating the low voltage level signal according to the first sensing signal and activating the gamepad according to the low voltage level signal when the timer determines that the duration of first sensing signal is longer than the predetermined threshold.

In addition, when the human hand is far away from the gamepad, the charges in the sensing antenna tend to a balanced condition. The sensing current is gone. At this time, the second sensing signal is generated accordingly to control the gamepad to pause.

In this embodiment, the control method further comprises:

S21: when the human hand is far away from (leaving) the gamepad, the sensor obtains the second sensing signal and the second timer records the duration of the second sensing signal.

S22: When the second timer determines that the second timer is longer than a predetermined threshold, the high voltage level signal is generated to control the gamepad to pause.

The predetermined threshold of the second timer could be the same as or different from the predetermined threshold of the first timer. In this embodiment, the above predetermined thresholds are the same and the same control circuit is used to generate the high voltage level signal and the low voltage level signal to perform the control function. The operation has been discussed above and is omitted here.

In addition, a storage medium is provided. The storage medium stores a plurality of instructions. The processor executes the instructions to perform any one of the above-mentioned control methods.

Figure 3:
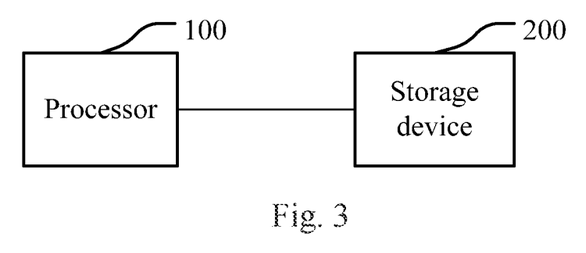
FIG. 3 is a functional block diagram of a gamepad according to an embodiment of the present invention.

The present disclosure also provides a gamepad as illustrated in FIG. 3 includes a processor 100 and a storage device 200.

The storage device 200 is configured to store a plurality of instructions.

The processor 100 is configured to execute the instructions to perform operations.

The detail of the operations are introduced in the following paragraph.

Specifically, the instructions are executed by the processor 100 to perform the operations as follows:

utilizing a sensor to obtain a first sensing signal when a human hand is close to the gamepad, wherein the first sensing signal is corresponding to a capacitance variance of a sensing antenna capacitor due to a charge variance in the sensing antenna of the sensor caused by the human hand;

generating a low voltage level signal according to the first sensing signal and activating the gamepad according to the low voltage level signal;

utilizing the sensor to obtain a second sensing signal and when the human hand is far from the gamepad, wherein the second sensing signal is corresponding to a capacitance variance of the sensing antenna capacitor due to a charge variance in the sensing antenna of the sensor caused by the human hand; and generating a high voltage level signal and control the gamepad to pause according to the high voltage level signal.

In the gamepad, the operation of generating the low voltage level signal according to the first sensing signal and activating the gamepad according to the low voltage level signal could comprise:

activating a first timer to record a duration of the first sensing signal; and generating the low voltage level signal according to the first sensing signal and activating the gamepad according to the low voltage level signal when the duration of the first sensing signal is longer than a predetermined threshold.

In addition, in the gamepad, the operation of generating the high voltage level signal and control the gamepad to pause according to the high voltage level signal could comprise:

utilizing a second timer to record a duration of the second sensing signal when the human hand is far from the gamepad; and when the duration of the second sensing signal is longer than a predetermined threshold, generating the high voltage level signal and control the gamepad to pause according to the high voltage level signal.

The sensor comprises a sensing antenna and a control circuit.

The sensor comprises a first sensor and a second sensor. The first sensor is installed in the first gamepad and the second sensor is installed in the second gamepad.

The control circuit comprises a main control module, an input module, an output module, an antistatic module, a filter module and a modulation module. The input module sends a sensing signal to the main control module through the anti-static module and the filter module. The anti-static module performs an anti-static operation on the sensing signal and the filter module performs a filtering operation on the sensing signal. The main control module generates a voltage level signal carrying a control signal according to the sensing signal and sends the voltage level signal carrying the control signal to the modulation module. The modulation module modulates the voltage level signal according to the control signal to output the low voltage level signal to the output module. The output module outputs the low voltage level signal to the main control module.

The input module comprises an input end, the output module comprises two output ends, the two output ends are respectively a PSENSOR output end and a FPIO7 PSENSOR output end. The main control module could be a main chip having a TIMER pin, a VSS pin, a CRXO pin, a VDDHI pin, a VREG pin, a THRI pin, a MOV THR pin, a THRO pin, a first OUT pin, a second OUT pin and a GND pin. The TIMER pin, the CRXO pin, the VDDHI pin, and the VRFG pin are respectively electrically connected to the filter module. The THRO pin and the THRI pin are respectively electrically connected to the modulation module. The CRXO pin is electrically connected to the input module and the antistatic module. The first OUT pin is electrically connected to the modulation module and the PSENSOR output end. The second OUT pin is electrically connected to the modulation module and the FPIO7 PSENSOR output end. The VSS pin and the GND pin are electrically connected to the ground.

The filter module comprise a first resistor R1, a second resistor R2, a first capacitor C1, a second capacitor C2, a third capacitor C3, a fourth capacitor C4 and a fifth capacitor C5. The first resistor R1 is electrically connected to the TIMER pin. One end of the second resistor R2 is electrically connected to the CRXO pin and another end of the second resistor R2 is electrically connected to the antistatic module and an input end. One end of the first capacitor C1 is electrically connected to the VDDHI pin and another end of the first capacitor C1 is electrically connected to the ground. One end of the second capacitor C2 is electrically connected to the VDDHI pin and another end of the second capacitor C2 is electrically connected to the ground. One end of the third capacitor C3 is electrically connected to the CRXO pin and another end of the third capacitor C3 is electrically connected to the ground. One end of the fourth capacitor C4 is electrically connected to the VREG pin and another end of the fourth capacitor C4 is electrically connected to the ground. One end of the fifth capacitor C5 is electrically connected to the VREG pin and another end of the fifth capacitor C5 is electrically connected to the ground.

The antistatic module comprises a TVS diode. One end of the TVS diode is electrically connected to the input end of the input module and the second resistor R2 of the filter module, and another end the TVS diode is electrically connected to a ground.

The modulation module comprises a third resistor R3, a fourth resistor R4, a fifth resistor R5, a sixth resistor R6, a seventh resistor R7, an eighth resistor R8 and a ninth resistor R9. The third resistor R3 and the fourth resistor R4 are respectively electrically connected to the THRI pin. The fifth resistor R5 and the sixth resistor R6 are respectively electrically connected to the THRO pin. The third resistor R3, the fourth resistor R4, the fifth resistor R5 and the sixth resistor R6 are used to modulate a sensitivity of a voltage level signal. The seventh resistor R7 is electrically connected to the first OUT pin and an end of the ninth resistor R9. Another end of the ninth resistor R9 is electrically connected to the PSENSOR output end. One end of the eighth resistor R8 is electrically connected to the FPIO7 PSENSOR output end and the second OUT pin and another end of the eighth resistor R8 is electrically connected to the ground. The seventh resistor R7, the eighth resistor R8 and the ninth resistor R9 are used to adjust a voltage level of the voltage level signal.

Figure 4:
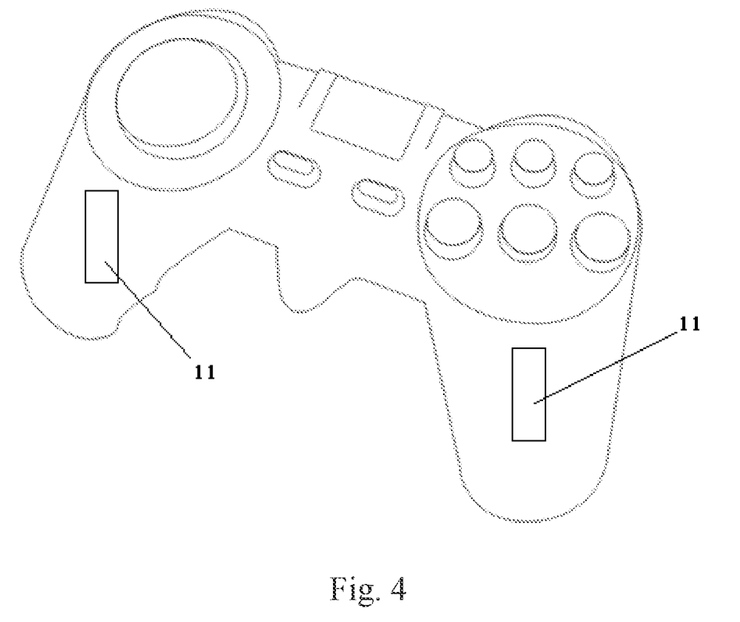
FIG. 4 is a diagram showing a structure of a gamepad according to an embodiment of the present invention.

As shown in FIG. 4, the first gamepad and the second gamepad respectively have a sensor 11. The sensor 11 could detect the human hand is close to (approaching) or far away from (leaving) the gamepad.

Any process or method described in the flowchart or otherwise described herein may be understood to include one or more modules, fragments, or portions of code of an executable instruction to implement a particular logical function or process. In addition, the scope of at least one embodiment of the present disclosure includes additional implementations in which the functions may be performed in a sequence that is not shown or discussed, including in a substantially simultaneous manner or in the reverse order depending on the function involved, which is understood by those skilled in the art to which this present disclosure pertains.

In addition, the functional units in the various embodiments of the present disclosure may be integrated into a processing module, or each unit may be physically present individually, or two or more units may be integrated into one module. The above integrated module may be implemented by using hardware, or may be implemented by using a software function module. The integrated module may be stored in a computer readable storage medium if it is implemented by a software function module and is sold or used as a standalone product.

It should be understood that the various parts of the present disclosure may be implemented by using hardware, software, firmware, or combinations thereof. In the above embodiment, the plurality of blocks or methods may be implemented by using software or firmware stored in the memory and executed by a suitable instruction execution system. For example, if the present disclosure is implemented by hardware, as in another embodiment, it may be implemented by any of the following techniques known in the art or a combination thereof: a discrete logic circuit of logic gates having a logic function for a data signal, an application specific integrated circuit with suitable combinational logic gates, a programmable gate array, a field programmable gate array, and the like.

The logic and/or blocks described in the flowchart or otherwise described herein, for example, a sequence list of an executable instruction for implementing a logic function, may be implemented in any computer-readable medium for use by an instruction execution system, device or equipment (such as a computer-based system, a system including a processor, or other system that can access instructions from an instruction execution system, device or equipment and execute instructions), or may be used in conjunction with the instruction execution system, device or equipment. As used herein, "computer-readable medium" may be any device that may include a store, communication, broadcast, or transmission program for use by an instruction execution system, device or equipment, or in conjunction with such instruction execution systems, device, or equipment. A more specific example (non-exhaustive list) of the computer-readable medium includes the following: an electrical connection portion (an electronic device) with one or more routing, a portable computer disk cartridge (a magnetic device), a random access memory (RAM), a read only memory (ROM), an erasable programmable read only memory (EPROM or a flash memory), a fiber optic device, and a portable compact disc read only memory (CDROM). In addition, the computer-readable medium may even be a paper or other suitable medium on which the program may be printed. For example, through performing an optical scan on the paper or other media, followed by editing, interpretation, or, if necessary, other suitable methods to process, the program is obtained in an electronic manner, and then the program is stored in a computer memory.

Above are embodiments of the present invention, which does not limit the scope of the present invention. Any modifications, equivalent replacements or improvements within the spirit and principles of the embodiment described above should be covered by the protected scope of the invention.

What is claimed is:

1. A control method of a gamepad, a surface of the gamepad comprises a sensor having a control circuit that comprises a main control module, an input module, an output module, an anti-static module, a filter module and a modulation module, the control method comprises:
   utilizing the sensor to obtain a first sensing signal when a human hand is close to the gamepad; and
   generating a low voltage level signal according to the first sensing signal and activating the gamepad according to the low voltage level signal;
   utilizing the sensor to obtain a second sensing signal and utilizing a second timer to record a duration of the second sensing signal when the human hand is far from the gamepad;
   when the duration of the second sensing signal is longer than a predetermined threshold, generating a high voltage level signal and control the gamepad to pause according to the high voltage level signal;
   sending a sensing signal from the input module to the main control module through the anti-static module and the filter module, wherein the anti-static module performs an anti-static operation on the sensing signal and the filter module performs a filtering operation on the sensing signal;
   utilizing the main control module to generate a voltage level signal carrying a control signal according to the sensing signal and sending the voltage level signal carrying the control signal to the modulation module;
   utilizing the modulation module to modulate the voltage level signal according to the control signal to output the low voltage level signal to the output module; and
   utilizing the output module to output the low voltage level signal.

2. The control method of claim 1, further comprising:
   activating a first timer to record a duration of the first sensing signal before the step of generating the low voltage level signal according to the first sensing signal and activating the gamepad according to the low voltage level signal.

3. The control method of claim 2, wherein the step of generating the low voltage level signal according to the first sensing signal and activating the gamepad according to the low voltage level signal comprises:
   generating the low voltage level signal according to the first sensing signal and activating the gamepad according to the low voltage level signal when the duration of the first sensing signal is longer than a predetermined threshold.

4. The control method of claim 1, wherein the anti-static module comprises a Transient Voltage Suppressor (TVS) diode, one end of the TVS diode is electrically connected to the input module and the filter module, and another end the TVS diode is electrically connected to a ground.

5. A gamepad comprising:
   a storage device, configured to store a plurality of instructions;
   a processor, configured to execute the instructions to perform following operations:
   utilizing a sensor to obtain a first sensing signal when a human hand is close to the gamepad, wherein the sensor comprises a sensing antenna and a control circuit, and the first sensing signal is corresponding to a capacitance variance of a sensing antenna capacitor due to a charge variance in the sensing antenna of the sensor caused by the human hand, and wherein the control circuit comprises a main control module, an input module, an output module, an antistatic module, a filter module and a modulation module; the input module sends a sensing signal to the main control module through the anti-static module and the filter module; the anti-static module performs an anti-static operation on the sensing signal and the filter module performs a filtering operation on the sensing signal; the main control module generates a voltage level signal carrying a control signal according to the sensing signal and sends the voltage level signal carrying the control signal to the modulation module; the modulation module modulates the voltage level signal according to the control signal to output the low voltage level signal to the output module; and the output module outputs the low voltage level signal to the main control module;

generating a low voltage level signal according to the first sensing signal and activating the gamepad according to the low voltage level signal;

utilizing the sensor to obtain a second sensing signal and when the human hand is far from the gamepad, wherein the second sensing signal is corresponding to a capacitance variance of the sensing antenna capacitor due to a charge variance in the sensing antenna of the sensor caused by the human hand; and generating a high voltage level signal and control the gamepad to pause according to the high voltage level signal.

6. The gamepad of claim 5, wherein the operation of generating the low voltage level signal according to the first sensing signal and activating the gamepad according to the low voltage level signal comprises:

activating a first timer to record a duration of the first sensing signal; and generating the low voltage level signal according to the first sensing signal and activating the gamepad according to the low voltage level signal when the duration of the first sensing signal is longer than a predetermined threshold.

7. The gamepad of claim 5, wherein the operation of generating the high voltage level signal and control the gamepad to pause according to the high voltage level signal comprises:

utilizing a second timer to record a duration of the second sensing signal when the human hand is far from the gamepad; and when the duration of the second sensing signal is longer than a predetermined threshold, generating the high voltage level signal and control the gamepad to pause according to the high voltage level signal.

8. The gamepad of claim 5, wherein the gamepad comprises a first gamepad and a second gamepad, a sensor comprises a first sensor and a second sensor, the first sensor is installed in the first gamepad and the second sensor is installed in the second gamepad.

9. The gamepad of claim 5, wherein the input module comprises an input end, the output module comprises two output ends, the two output ends are respectively a PSENSOR output end and a FPIO7 PSENSOR output end; the main control module comprises a main chip having a TIMER pin, a VSS pin, a CRXO pin, a VDDHI pin, a VREG pin, a THRI pin, a MOV THR pin, a THRO pin, a first OUT pin, a second OUT pin and a GND pin; the TIMER pin, the CRXO pin, the VDDHI pin, and the VRFG pin are respectively electrically connected to the filter module, the THRO pin and the THRI pin are respectively electrically connected to the modulation module; the CRXO pin is electrically connected to the input module and the antistatic module; the first OUT pin is electrically connected to the modulation module and the PSENSOR output end; the second OUT pin is electrically connected to the modulation module and the FPIO7 PSENSOR output end; and the VSS pin and the GND pin are electrically connected to the ground.

10. The gamepad of claim 5, wherein the filter module comprise a first resistor, a second resistor, a first capacitor, a second capacitor, a third capacitor, a fourth capacitor and a fifth capacitor; the first resistor is electrically connected to a TIMER pin, one end of the second resistor is electrically connected to a CRXO pin and another end of the second resistor is electrically connected to the antistatic module and an input end; one end of the first capacitor is electrically connected to a VDDHI pin and another end of the first capacitor is electrically connected to a ground; one end of the second capacitor is electrically connected to a VDDHI pin and another end of the second capacitor is electrically connected to the ground; one end of the third capacitor is electrically connected to a CRXO pin and another end of the third capacitor is electrically connected to the ground; one end of the fourth capacitor is electrically connected to a VREG pin and another end of the fourth capacitor is electrically connected to the ground; and one end of the fifth capacitor is electrically connected to the VREG pin and another end of the fifth capacitor is electrically connected to the ground.

11. The gamepad of claim 5, wherein the antistatic module comprises a TVS diode, one end of the TVS diode is electrically connected to an input end of the input module and a second resistor of the filter module, and another end the TVS diode is electrically connected to a ground.

12. The gamepad of claim 5, wherein the modulation module comprises a third resistor, a fourth resistor, a fifth resistor, a sixth resistor, a seventh resistor, an eighth resistor and a ninth resistor; the third resistor and the fourth resistor are respectively electrically connected to a THRI pin, the fifth resistor and the sixth resistor are respectively electrically connected to a THRO pin, the third resistor, the fourth resistor, the fifth resistor and the sixth resistor are used to modulate a sensitivity of a voltage level signal; the seventh resistor is electrically connected to a first OUT pin and an end of the ninth resistor; another end of the ninth resistor is electrically connected to a PSENSOR output end; one end of the eighth resistor is electrically connected to a FPIO7 PSENSOR output end and a second OUT pin and another end of the eighth resistor is electrically connected to a ground; the seventh resistor, the eighth resistor and the ninth resistor are used to adjust a voltage level of the voltage level signal.

* * * * *